United States Patent
Hellmann et al.

(10) Patent No.: US 6,551,686 B1
(45) Date of Patent: Apr. 22, 2003

(54) BIAXIALLY ORIENTED POLYESTER FILM HAVING MORE THAN ONE LAYER, PROCESS FOR ITS PRODUCTION, AND ITS USE AS MAGNETIC TAPE FILM

(75) Inventors: Joerg Hellmann, Mainz (DE); Gottfried Hilkert, Saulheim (DE); Wolfram Goerlitz, Wiesbaden (DE)

(73) Assignee: Mitsubishi Polyester Film GmbH, Wiesbaden (DE)

(*) Notice: Subject to any disclaimer, the term of this patent is extended or adjusted under 35 U.S.C. 154(b) by 0 days.

(21) Appl. No.: 09/282,452

(22) Filed: Mar. 31, 1999

(30) Foreign Application Priority Data

Apr. 1, 1998 (DE) .......................... 198 14 710

(51) Int. Cl.⁷ .................. B32B 5/22; B32B 27/06; B32B 27/36; B32B 31/16; B32B 31/30
(52) U.S. Cl. .................. 428/141; 428/212; 428/220; 428/323; 428/336; 428/480; 428/694 ST; 428/694.56; 428/910; 156/244.24; 264/173.15
(58) Field of Search .................. 428/141, 212, 428/220, 323, 336, 480, 694 ST, 694 SG, 910; 156/244.24; 264/173.15

(56) References Cited

U.S. PATENT DOCUMENTS

| | | | |
|---|---|---|---|
| 3,515,626 A | 6/1970 | Duffield | 423/327.1 |
| 3,958,064 A | 5/1976 | Brekken et al. | 428/336 |
| 4,042,569 A | 8/1977 | Bell et al. | 528/272 |
| 4,252,885 A | 2/1981 | McGrail et al. | 430/160 |
| 4,399,179 A | 8/1983 | Minami et al. | 428/212 |
| 4,493,872 A | 1/1985 | Funderburk et al. | 428/332 |
| 4,615,939 A | 10/1986 | Corsi et al. | 428/323 |
| 4,622,237 A | 11/1986 | Lori | 427/446 |
| 5,236,680 A | 8/1993 | Nakazawa et al. | 428/328.1 |
| 5,236,683 A | 8/1993 | Nakazawa et al. | 423/335 |
| 5,242,757 A | 9/1993 | Buisine et al. | 428/480 |
| 5,429,785 A | 7/1995 | Jolliffe | 264/216 |
| 5,453,260 A | 9/1995 | Nakazawa et al. | 428/325 |
| 5,468,527 A | 11/1995 | Peiffer et al. | 428/35.7 |
| 5,506,014 A | 4/1996 | Minnick | 428/35.7 |

FOREIGN PATENT DOCUMENTS

| | | |
|---|---|---|
| EP | 0 035 835 | 9/1981 |
| EP | 0 061 769 | 10/1982 |
| EP | 0 088 635 | 9/1983 |
| EP | 0 124 291 | 11/1984 |
| EP | 0 135 451 A1 | 3/1985 |

(List continued on next page.)

OTHER PUBLICATIONS

Encyclopedia of Polymer Science and Engineering, vol. 15, Sheeting: Manufacturing Techniques, pp. 147–154, Oct. 1989.*

(List continued on next page.)

Primary Examiner—Paul Thibodeau
Assistant Examiner—Ramsey Zacharia
(74) Attorney, Agent, or Firm—Finnegan, Henderson, Farabow, Garrett & Dunner, L.L.P.

(57) ABSTRACT

The invention relates to a biaxially oriented polyester film which has three layers and which, together with very good electromagnetic properties compared with prior art films, has improved abrasion properties. The two sides of the film are built up from at least one base layer B and, applied to this base layer, outer layers A and C, where these outer layers have a defined number of elevations of defined height. The invention also relates to a process for producing the film and to its use as magnetic tape film.

20 Claims, 1 Drawing Sheet

FOREIGN PATENT DOCUMENTS

| | | |
|---|---|---|
| EP | 0 144 878 | 6/1985 |
| EP | 0 236 945 | 9/1987 |
| EP | 0 296 620 | 12/1988 |
| EP | 0 347 646 A2 | 12/1989 |
| EP | 0 378 154 | 7/1990 |
| EP | 0 402 861 | 12/1990 |
| EP | 0 490 665 | 6/1992 |
| EP | 0 502 745 A2 | 9/1992 |
| EP | 0 514 129 | 11/1992 |
| EP | 0 515 096 | 11/1992 |
| EP | 0 551 905 | 7/1993 |
| EP | 0 580 404 | 1/1994 |
| EP | 0 581 970 | 2/1994 |
| EP | 0 590 570 | 4/1994 |
| EP | 0 602 964 A1 | 6/1994 |
| EP | 0 604 057 | 6/1994 |
| EP | 0 609 060 A1 | 8/1994 |
| EP | 0 612 790 | 8/1994 |
| EP | 0 659 810 | 6/1995 |
| EP | 0 663 286 A1 | 7/1995 |
| EP | 0 685 509 | 12/1995 |
| EP | 0 707 979 | 4/1996 |
| EP | 0 826 478 | 3/1998 |
| WO | WO 88/10188 | 12/1988 |
| WO | WO 94/13476 | 6/1994 |
| WO | WO 94/13481 | 6/1994 |
| WO | WO 94/13482 | 6/1994 |
| WO | WO 98/13414 | 4/1998 |
| WO | WO 98/13415 | 4/1998 |

OTHER PUBLICATIONS

Ullmann's Encyclopedia of Industrial Chemistry, 5th Edition, vol. A 11: Films, pp. 85–111, May 1994.*

Weiss, J., *Parameters that influence the barrier properties of metallized polyester and polypropylene films*, Thin Solid Films, vol. 204, 203–216 (1991).

Kimura, S.F. et al., *FTIR Spectroscopic Study on Crystallization Process of Poly (ethylene–2,6–napthalate)*, Journal of Polymer Science: Polymer Physics, vol. 35, 2741–2747 (1997).

Bursch et al., "Biaxially Oriented Polyester Film for SMD Condensers—Made by Extrusion Followed by Biaxial Stretching and Heat Fixing to Give Specified Shrinkage Parameters in the Machine Direction and Transverse Direction." Derwent Abstract, WPI Acc. No. 98–194495/199818 (1998).

Database WPI, Section Ch, Week 9522, Derwent Publications Ltd., London, GB; Class A32, AN 95–166886, XP002114408 & JP 07 088592 A (Toray Indus., Inc.) (Apr. 4, 1995).

Database WPI, Section Ch, Week 9615, Derwent Publications Ltd., London, GB; Class A23, AN 96–148338, XP002114377 & JP 08 03679 A (Toray Indus., Inc.) (Feb. 6, 1996).

* cited by examiner

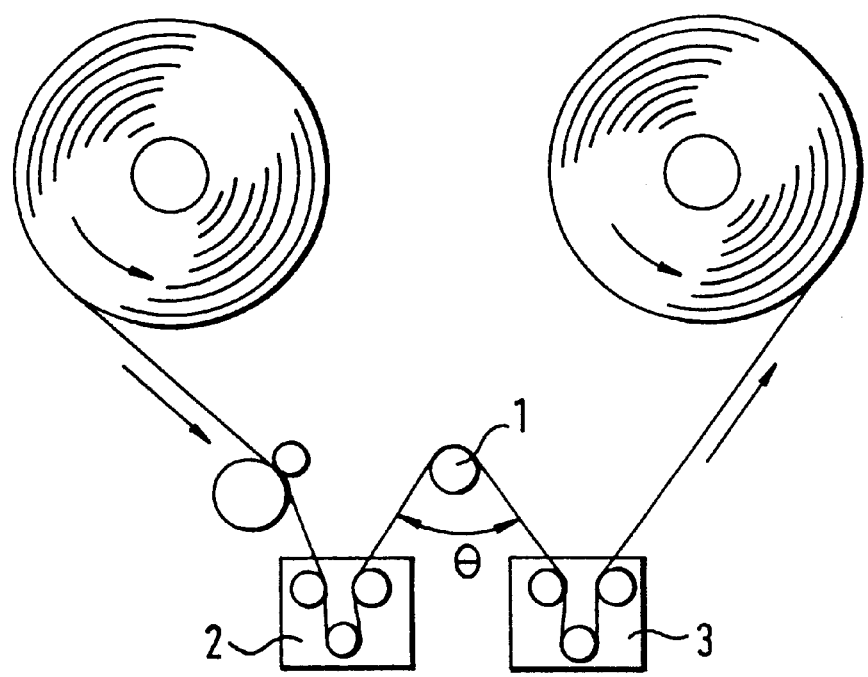

BIAXIALLY ORIENTED POLYESTER FILM HAVING MORE THAN ONE LAYER, PROCESS FOR ITS PRODUCTION, AND ITS USE AS MAGNETIC TAPE FILM

The invention relates to a biaxially oriented polyester film which has at least three layers and which, together with electromagnetic properties which are better than those of prior art films, has improved abrasion properties, and which is cost-effective to produce and is built up from at least one base layer B and, applied to both sides of this base layer, outer layers A and C, where these outer layers have $R_a$ values and $R_z$ values and a defined number of elevations of defined height, and the film has a haze per unit thickness of $\leq 0.4\%/\mu m$. The invention also relates to a process for producing the film and to its use, in particular as magnetic tape film.

BACKGROUND OF THE INVENTION

Due in particular to their excellent mechanical properties, polyester films have for a long time been used as substrate for magnetic recording materials. An ideal magnetic recording medium with good electromagnetic properties has a surface which is as smooth as possible. For good processing performance during coating and in subsequent use, and in order to achieve good abrasion performance, the surface should have a degree of roughness. Monofilms (single-layer films) can fulfil these requirements, which are per se contradictory, only if there is a degree of readiness to compromise, since in these films the optimization of one of the properties always disadvantages the other property.

Coextruded films having more than one layer (AB, ABA and ABA') with which it is possible to achieve "dual-surface" properties have now also been disclosed, however. By this means it is possible, to a limited extent, to attribute differing properties (roughness, topographies) to the two film surfaces, but the contradictory requirements for improved electromagnetic properties together with good abrasion performance are not met.

DESCRIPTION OF THE RELATED ART

EP-A-0 135 451, for example, describes a "dual-surface" film of A/B type where the two film surfaces have differing $R_a$ values. However, these films have the disadvantage of not being cost-effective to produce, since the two layers—corresponding to two monofilms lying one upon the other—have to be provided with particle systems and therefore do not permit any cost saving in comparison with monofilms. The quality of the magnetic tape film will be impaired, furthermore, by the regenerated film material (regrind) which arises in all commercial production processes and has (necessarily) to be reused, and which must be incorporated into at least one surface layer of the A/B film.

EP-A-0 609 060 and EP-A-0 663 286 achieve an improvement with respect to this quality problem by the principle of A/B/A coextrusion, enabling the effect of the regenerated material on the film surface to be reduced by the screening effect of the two outer layers A. However, A/B/A films outwardly exhibit the character of (thin) monofilms, i.e. the advantage of creating differing surface properties has been lost. However, a "dual-surface" character can be introduced to a limited extent in A/B/A films via differing thicknesses of the outer layers A. Films of this type are then termed A/B/A' films ($\neq$A/B/C). A disadvantage of these films, however, is that flexibility for the different design of the surface topographies of the two film surfaces remains very restricted. There is also no effect on properties such as electromagnetic properties or abrasion resistance, as is shown in Comparative Examples 1 to 6.

A few A/B/C films and A/B/C/B films have also been produced and described (EP-A-0 502 745), but here again at least one surface layer comprises regenerated material—which has the disadvantages described above—or else the information is unspecific for A/B/C films (EP-A-0 347 646).

BRIEF SUMMARY OF THE INVENTION

It was therefore an object of the present invention to provide a coextruded, biaxially oriented polyester film which has more than one layer and which is suitable as substrate for magnetic recording media and, at the same time, has a smoother surface (for good electromagnetic properties of the magnetic tape) and a rougher surface (for good processing performance on high-speed coating systems and good running performance subsequently when the tape is in operation) and low abrasion. It should moreover be possible to produce the high-quality film (with low drop-out values) cost-effectively (at low cost).

BRIEF DESCRIPTION OF THE DRAWING

The FIGURE illustrates a modified audiotape machine. The machine comprises two measuring devices (2 and 3) to check tape tension and a pin(1) over which one side of the surface of the film is pulled at a specified speed and at a specified angle ($\Theta$).

DESCRIPTION OF THE INVENTION

This object is achieved by means of a biaxially oriented, coextruded polyester film which has at least three layers and whose two surfaces are formed by outer layers A and C, where a base layer B is located between these outer layers, and wherein the outer layer A has an $R_a$ value of $\leq 15$ nm, has an $R_z$ value of $\leq 150$ nm and has a number of elevations/protrusions $N_a$ per 0.36 mm$^2$ which is related as follows to their respective heights $h_a$:

$$A_1 \cdot e^{-B_1 \cdot h_a} \leq N_a \leq A_2 \cdot e^{-B_2 \cdot h_a} \tag{1}$$

where $A_1 = 300$, $A_2 = 7000$ $B_1 = 7.0$, $B_2 = 8.0$ $0.01\ \mu m \leq h_a \leq 1.0\ \mu m$ and the outer layer C has an $R_a$ value which is greater than that of the outer layer A and a number of elevations/protrusions $N_c$ per 0.36 mm$^2$ which is related as follows to their respective heights $h_c$:

$$N_c \leq F \cdot e^{-G \cdot h_c} \tag{2}$$

where $F = 20{,}000$, $G = 9.0$ and where the haze per unit thickness is $\leq 0.4\%/\mu m$.

For the purposes of the present invention, elevations/protrusions are understood to be cone-shaped elevations/protrusions which stand out from the flat film surface.

For good electromagnetic properties, the required roughnesses of the outer layer A which carries the magnetic coating are $R_a \leq 15$ nm and $R_z < 150$ nm. To achieve the desired electromagnetic properties of the outer layer A, furthermore, as required by equation (1), the number of elevations/protrusions $N_a$ per 0.36 mm² of film surface must be within the range specified in equation (1). Equation (1) defines this range for different heights of the elevations/protrusions.

To achieve good electromagnetic properties for the outer layer A, a certain number of elevations/protrusions $N_a$ per 0.36 mm² is required on the film surface to be magnetically coated. If the number is higher than the upper limit defined in equation (1) for different heights $h_a$, then the electromagnetic properties (e.g. the C—S/N ratio) become worse. If the number is lower than the lower limit given in equation (1), then problems may arise during processing of the film or during running of the magnetic tape in the video recorder.

To achieve good running and good abrasion performance, a rough reverse side (outer layer C) is required. It is useful if the difference in the $R_a$ values between sides A and C is at least 2 nm, preferably 3 nm, particularly preferably 4 nm. However, it should not be greater than 10 nm, preferably 8 nm, particularly preferably 7 nm.

The roughness of this outer layer must be greater than that of the outer layer A. To avoid transcription effects from the rough reverse side affecting the smooth magnetic layer (extruded onto outer layer A) in the wound-up magnetic tape, the number of elevations $N_c$/0.36 mm² must be lower than the upper limit specified in equation (2).

For comparable service characteristics "dual-surface" films of A/B type have to be produced with an increased amount of particles, and this is inevitably associated with an increase in haze. Novel films with at least equal service characteristics may be produced with considerably fewer particles, resulting in lower production costs and lower haze values. The haze per unit thickness value of the novel films is $\leq 0.4\%/\mu m$, the ha per unit thickness being defined as the haze of the film in accordance with the ASTM-D 1003-61 standard divided by the entire thickness in $\mu m$ of the film under measurement.

It has proven particularly useful for the $R_a$ value of the outer layer A to be preferably $\leq 13$ nm, in particular $\leq 11$ nm. The $R_z$ value of this surface is preferably $\leq 130$ nm, particularly preferably $\leq 110$ nm. The topography of the outer layer A, expressed by equation (1), is preferred when $A_1=500$, in particular $A_1=600$ and/or $A_2$ preferably=6000, in particular 5000 and/or $B_1$ preferably=6.8, in particular $B_1=6.6$ and/or $B_2$ preferably=7.9, in particular $B_2=7.8$.

The outer layer C preferably has a roughness $R_a \leq 25$ nm, in particular $\leq 20$ nm, very particularly preferably $\leq 18$ nm, where the condition that the roughness $R_a$ of the outer layer C is always greater than that of the outer layer A is also fulfilled. Preference is given to a topography of the outer layer C in which the parameters F and G of equation (2) take the following values: F=18,000, in particular F=16,000 and/or G=9.2, in particular G=9.4.

Preferred values of haze per unit thickness for the novel film are $\leq 0.35\%/\mu m$, in particular $\leq 0.30\%/\mu m$.

In the preferred and the particularly preferred embodiments, the novel film surprisingly has good quality, improved transcription performance and improved running during further processing at high speeds.

To achieve good electromagnetic properties, and also high abrasion resistance and essentially avoidance of transcription, the outer layers of the novel film comprise pigments. The control of the extent to which the topography is developed in the context of equations (1) and (2) is advantageously exerted by varying the concentrations of the pigments and/or their median particle size $d_{50}$.

Pigment concentrations which have proven useful for achieving the topography of the outer layer A in accordance with equation (1) are from 500 to 10,000 ppm, preferably from 800 to 8000 ppm, in particular from 1000 to 6000 ppm, with median particle sizes ($d_{50}$) of from 0.1 to 2.0 $\mu m$, preferably from 0.2 to 1.5 $\mu m$, in particular from 0.3 to 1.0 $\mu m$. If the pigments used are pigments capable of agglomeration, such as $Al_2O_3$ or $SiO_2$, then "median particle size" means their secondary particle size. The primary particle sizes of pigments of this type are usually from 10 to 100 nm. The distribution of the pigment systems used may be monomodal or may also, for a mixture of two or more pigment systems, be bimodal or multimodal, where in the case of the bimodal distribution there is a difference in their respective $d_{50}$ values. Preference is given to pigments with a narrow particle size distribution.

Pigment concentrations which have proven useful for achieving the topographies of the outer layer C in accordance with equation (2) are from 1000 to 15,000 ppm, preferably from 2000 to 12,000 ppm, in particular from 3000 to 10,000 ppm with median particle sizes ($d_{50}$) of from 0.1 $\mu m$ to 2.0 $\mu m$, preferably from 0.2 $\mu m$ to 1.8 $\mu m$, in particular from 0.3 $\mu m$ to 1.5 $\mu m$. If the pigments used are capable of agglomeration, for example $Al_2O_3$ or $SiO_2$, the "median particle size" means their secondary particle size. The primary particle sizes of pigments of this type are usually from 10 to 100 nm.

According to the invention, the film is built up from at least three layers and has on one side of layer B (=base layer) the outer layer A and on the other side of the layer B another outer layer C made from polyethylene terephthalate. Both of the outer layers comprise the pigments required for achieving the topographies of the film.

Various raw materials may in principle be used for the materials of the various layers. However, it is preferable for the production of the individual layers to be based on polyester raw materials.

The base layer B of the film is preferably composed to an extent of at least 90% by weight of a thermoplastic polyester. Polyesters suitable for this are those made from ethylene glycol and terephthalic acid (=polyethylene terephthalate, PET), from ethylene glycol and naphthalene-2,6-dicarboxylic acid (=polyethylene 2,6-naphthalate, PEN), from 1,4-bis-hydroxymethylcyclo-hexane and terephthalic acid (=poly-1,4-cyclohexanedimethylene terephthalate, PCDT) or from ethylene glycol, naphthalene-2,6-dicarboxylic acid and biphenyl-4,4'-dicarboxylic acid (=polyethylene 2,6-naphthalate dibenzoate, PENBB). Particular preference is given to polyesters which are composed to an extent of at least 90 mol %, preferably at least 95 mol %, of ethylene glycol and terephthalic acid units or of ethylene glycol and naphthalene-2,6-dicarboxylic acid units. The remaining monomer units are derived from other aliphatic, cycloaliphatic or aromatic diols and dicarboxylic acids, which may also be present in the layer A (or the layer C).

Examples of other suitable aliphatic diols are diethylene glycol, triethylene glycol, aliphatic glycols of the formula HO—$(CH_2)_n$—OH, where n is an integer from 3 to 6 (in particular 1,3-propanediol, 1,4-butanediol, 1,5-pentanediol and 1,6-hexanediol), or branched aliphatic glycols having up to 6 carbon atoms. Of the cycloaliphatic diols, cyclohexane diols (in particular 1,4-cyclohexanediol) should be mentioned. Examples of suitable aromatic diols are those of the formula HO—$C_6H_4$—X—$C_6H_4$—OH, where X is —$CH_2$—, —$C(CH_3)_2$—, —$C(CF_3)_2$—, —O—, —S— or —$SO_2$—. Besides these, bisphenols of the formula HO—$C_6H_4$—$C_6H_4$—OH are also very suitable.

Aromatic dicarboxylic acids are preferably benzenedicarboxylic acids, naphthalenedicarboxylic acids (for example naphthalene-1,4- or -1,6-dicarboxylic acid), biphenyl-x,x'-dicarboxylic acids (in particular biphenyl-4,4'-dicarboxylic acid), diphenylacetylene-x,x'-dicarboxylic acids (in particular diphenylacetylene-4,4'-dicarboxylic acid) and stilbene-x,x'-dicarboxylic acids. Of the cycloaliphatic dicarboxylic acids, mention should be made of cyclohexanedicarboxylic acids (in particular cyclohexane-1,4-dicarboxylic acid). Particularly suitable aliphatic dicarboxylic acids are the $C_3$–$C_{19}$-alkanedioic acids, the alkane part of which may be straight-chain or branched.

The polyesters may be prepared by the transesterification process, the starting materials for which are dicarboxylic esters and diols, which are reacted using the customary transesterification catalysts, such as salts of zinc, of calcium, of lithium, of magnesium and of manganese. The intermediates are then polycondensed in the presence of widely used polycondensation catalysts, such as antimony trioxide or titanium salts. The preparation may be carried out just as successfully by the direct esterification process in the presence of polycondensation catalysts, starting directly from the dicarboxylic acids and the diols.

Advantageous processes are those using transesterification catalysts which produce only few and/or small elevations/protrusions on the surface of the film. Preference is given, in particular, to the salts of magnesium and manganese. These transesterification catalysts are advantageously used for preparing the basic raw material, but particularly advantageously for preparing the raw material for the outer layers.

In principle, the same polymers may be used for the outer layers as for the base layer. Besides these, other materials may also be present in the outer layers, in which case the outer layers are preferably composed of a mixture of polymers, of a copolymer or of a homopolymer which contains ethylene 2,6-naphthalate units and ethylene terephthalate units. Up to 10 mol % of the polymers may be composed of other comonomers (see above).

In principle, the polymers used for any intermediate layers present may be those described above for the base layer and the outer layers.

The base layer and the other layers may also comprise customary additives, such as stabilizers and/or antiblocking agents. They are expediently added to the polymer or to the polymer mixture even before melting takes place. Examples of stabilizers are phosphorus compounds, such as phosphoric acid and phosphoric esters.

Typical antiblocking agents (also termed pigments in this context) are inorganic and/or organic particles, for example calcium carbonate, amorphous silica, talc, magnesium carbonate, barium carbonate, calcium sulfate, barium sulfate, lithium phosphate, calcium phosphate, magnesium phosphate, alumina, LiF, the calcium, barium, zinc and manganese salts of the dicarboxylic acids used, carbon black, titanium dioxide, kaolin and crosslinked polystyrene particles and crosslinked acrylate particles.

The additives selected may also be mixtures of two or more different antiblocking agents or mixtures of antiblocking agents of the same composition but of different particle size. The particles may be added to the individual layers in the respective advantageous concentrations, e.g. via masterbatches during extrusion. Pigment concentrations of from 0.1 to 5% by weight have proven particularly suitable. A detailed description of the suitable antiblocking agent is found, for example, in EP-A-0 602 964.

The base layer of the novel film is essentially unpigmented, but may comprise a controlled amount of pigments via the introduction of regenerated material (=reusable film residues). This amount is selected in such a way that it does not have an adverse effect on the number of elevations/protrusions, in particular in the outer layer $A(N_a)$.

The novel polyester film is built up from at least three layers and comprises the two outer layers A and C. The thickness and composition of the second outer layer C may be selected independently of the outer layer A, and the second layer here may likewise comprise the abovementioned polymers or polymer mixtures, but these do not have to be identical with those of the first outer layer. The second outer layer may also comprise other common outer layer polymers. The two outer layers preferably have the same thickness. The advantage of the novel film is specifically that the differing outer layer topographies can be established by controlled variation of the pigment concentration and/or of the pigment particle size while the thickness of the outer layers is essentially the same.

If desired, there may also be an intermediate layer between the base layer and the outer layers. This also may be composed of the polymers described for the base layer. In a particularly preferred embodiment, it is composed of the polyester used for the base layer. It may also comprise the additives described for the outer layers. The thickness of the intermediate layer is generally of the order of size of the thicknesses of the outer layers.

In the novel film, which has three layers, the thicknesses of the outer layers A and C are generally greater than 0.2 µm and are in the range from 0.3 to 2.5 µm, preferably in the range from 0.5 to 2.0 µm, particularly preferably in the range from 0.7 to 1.8 µm. The outer layers A and C may have the same or different thicknesses. They preferably have essentially the same thickness.

The total thickness of the novel polyester film can vary within wide limits. It is from 5 to 40 µm, in particular from 7 to 30 µm and particularly preferably from 9 to 20 µm.

To produce the layers A and C (outer layers A and C), pellets of polyethylene terephthalate are in each case fed to an extruder. The materials are melted at about 300° C. and extruded.

The polymers for the base layer are usefully fed through another extruder. Any foreign bodies or contaminations which may be present can be screened out from the polymer melt before extrusion. The melts are then shaped in a coextrusion die to give flat melt films, and are laminated together. The film, which has more than one layer, is then drawn off and solidified with the aid of a chill roll and, if desired, of other rolls.

The biaxial orientation is generally carried out sequentially. For this it is preferable to orientate firstly in a longitudinal direction (i.e. in the machine direction) and then in a transverse direction (i.e. perpendicularly to the machine direction). This causes an orientation of the molecular chains. The orientation in a longitudinal direction may be carried out with the aid of two rolls running at different speeds corresponding to the desired stretching ratio. For the transverse orientation, use is generally made of an appropriate tenter frame.

To increase the strength of these films, the transverse orientation may also be followed by yet another orientation in a longitudinal direction.

The temperature at which the orientation is carried out can vary over a relatively wide range and depends on the properties desired in the film. In general, the longitudinal stretching is carried out at from glass transition temperature $(T_g)$+10 to $T_g$+60° C. and the transverse stretching at from $T_g$+20 to $T_g$+80° C. The longitudinal stretching ratio is generally in the range from 2.5:1 to 6:1, preferably from 3:1 to 5.5:1. The transverse stretching ratio is generally in the range from 3.0:1 to 5.0:1, preferably from 3.5:1 to 4.5:1.

Before the transverse stretching, one or both surface(s) of the film may be in-line coated by the known processes. The in-line coating may serve, for example, for improved adhesion of the magnetizable layer or else for improvement of antistatic performance or of processing performance.

In the subsequent heat-setting, the film is held for from about 0.1 to 10 s at a temperature of from 150 to 250° C. The film is then wound up in a customary manner.

Before applying the magnetizable layer to one or both side(s), the biaxially oriented and heat-set polyester film may be corona- or flame-treated. The intensity of treatment is selected in such a way that the surface tension of the film is generally greater than 45 mN/m.

Magnetizable layers are, if desired, applied in conventional industrial systems.

An advantage of the invention is that the production costs of the novel film are lower than those of the prior art. The processing properties and performance characteristics of the novel film are tailored to the properties which are desired. The film wastes produced during production of the film are reused in the form of regenerated material without reducing quality.

The film has excellent suitability as a substrate film for magnetic tapes. It also has excellent suitability as a thermal transfer ribbon.

In summary, the novel film has very good electromagnetic properties together with high abrasion resistance and negligible transcription, and also low drop-out values. The film also has good antistatic properties. In addition, it has the desired good processing performance, in particular excellent slitability and winding characteristics.

The following table (Table 1) gives once again the most important film properties according to the invention.

TABLE 1

|  | Range according to the invention | Preferred | Particularly preferred | Unit | Measurement method |
|---|---|---|---|---|---|
| $R_a(A)$, | <15 | <13 | <11 | nm | DIN 4768 |
| $R_z(A)$ | <150 | <130 | <110 |  | DIN 4268 |
| $A_1/A_2$ | 300/7000 | 500/6000 | 800/5000 |  |  |
| $B_1/B_2$ | 7.0/8.0 | 6.8/7.9 | 6.6/7.8 |  |  |
| $R_a(C)$ | <25 | <20 | <18 | nm | DIN 4768 |
| F/G | 20,000/9.0 | 18,000/9.2 | 16,000/9.4 |  |  |
| Haze per unit thickness | ≦0.4 | ≦0.35 | ≦0.3 |  | ASTM-D 1003-61 |

The following methods were used to determine parameters for the films:

Determination of Roughness

The roughness $R_a$ of the film was determined in accordance with DIN 4762 with a cut-off of 0.08 mm.

Apparatus: Perthometer S8P® (Hommel) on glass sheet
Scanner: RFHTB-50 with runner
Pin diameter: 5 μm
Force applied: 0.4 mN
Spacing runner:−25 mm

Determination of Haze

The haze of the film was determined in accordance with ASTM-D 1003-61 (measurement method A) with a BYK Gardner Hazemeter XL-211. The haze per unit thickness is given by $$\frac{\text{Haze} \quad \%}{\text{total film thinkness } \mu m} \quad (3)$$

Shadow-topographic Determination of the Number of Elevations on Film Surfaces A scanning electron microscope and an image analysis system were used to determine the size distribution of elevations on film surfaces. Use is made of the XL30 CP scanning electron microscope from Philips with an integrated image analysis program: AnalySIS® from Soft-Imaging System.

For these measurements, specimens of film are placed flat on a specimen holder. These are then metallized obliquely at an angle α with a thin metallic layer (e.g. of silver); α here is the angle between the surface of the specimen and the direction of diffusion of the metal vapor. This oblique metallization throws a shadow behind the elevation. Since the shadows are not at this stage electrically conductive, the specimen is then further sputtered or metallized with a second metal (e.g. gold), the second coating here impacting vertically onto the surface of the specimen in such a way that it does not result in any shadows in the second coating.

Scanning electron microscope (SEM) images are taken of the specimen surfaces prepared in this way. The shadows of the elevations are visible because of the contrast of the metallic materials. The specimen is oriented in the SEM in such a way that the shadows run parallel to one edge of the image. The following conditions are set in the SEM for recording the image: secondary electron detector, operating distance 10 mm, acceleration voltage 10 kV and spot 4.5. The brightness and contrast are set in such a way that all of the information in the image is represented as grey values and the intensity of the background noise is sufficiently small for it not to be detected as a shadow. The length of the shadows is measured by image analysis. The threshold value for shadow-identification is set at the point where the second derivative of the grey value distribution of the image passes through the zero point. Before shadow identification, the image is smoothed with an N×N filter (size 3, 1 iteration). A frame is set so as to ensure that elevations which are not reproduced in their entirety in the image are not included in the measurements. The magnification, the size of the frame and the number of images evaluated are selected in such a way that a total film surface of 0.36 mm² is evaluated.

The height of the individual elevations is computed from the individual shadow lengths using the following relationship:

$$h = (\tan \alpha)^* L \quad (4)$$

where h is the height of the elevation, α is the metallization angle and L is the shadow length. The elevations registered in this way are classified so as to arrive at a frequency distribution. The classification is into classes of 0.05 μm width between 0 and 1 μm, the smallest class (from 0 to 0.05 μm) not being used for further evaluation calculations.

Determination of Electromagnetic Properties

Electromagnetic properties were determined in accordance with DIN IEC 60 B (CO) 69.

The Coex A (Examples 1 to 9) or, respectively, the outward-facing (Comparative Examples 1 to 7) side of the films was magnetically coated by known processes and calendered, and the electromagnetic properties determined were assessed.

The thickness of the magnetic layer is typically from 1.8 to 2.0 μm.

Abrasion Resistance

Abrasion resistance was determined using a modified audiotape machine, as shown FIG. 1. The equipment in the apparatus comprises two measuring devices (2 and 3) to check tape tension and a pin (1) over which one side of the surface of the film is pulled at a specified speed and at a specified angle (⊖). The abrasion created at the pin is classified by optical and microscopic methods (−=substantial abrasion, 0=abrasion comparable with standard, +=better than standard, ++=little abrasion).

To determine abrasion resistance, appropriate slit lengths were prepared, 1 cm in width and 200 meters in length. In each case abrasion resistance was determined only on the film side subsequently used as reverse side of the magnetic tape.

Tape speed: 19 cm/sec

Tape tension: 200 g

Contact angle ⊖: 135°

Pin: SUS 204 2S, φ 6 mm, $CrO_2$ surface

EXAMPLES 1 TO 9

Polyethylene terephthalate chips (prepared via the transesterification process using Mn as transesterification catalyst; Mn concentration: 100 ppm) and regrind of identical type with a "general" particle concentration of 1150 ppm ($CaCO_3$<1.0 μm; $Al_2O_3$ 0.06 μm) were dried at 135° C. to a residual moisture of less than 50 ppm and fed to the extruder for the base layer B.

In addition, mixtures of polyethylene terephthalate chips (prepared via the transesterification process using Mn as transesterification catalyst; Mn concentration: 100 ppm) which have been pigmented as shown in Table 2 were fed, without drying, to the respective twin-screw extruders for the outer layers A and C.

A transparent film which has three layers A/B/C and a total thickness of 15 μm was produced by coextrusion followed by stepwise orientation in longitudinal and transverse directions. The thickness of each of the outer layers was regulated via the throughput of the coextruders and was set as given in Tables 2 and 3.

Base Layer B 50.0% by weight of polyethylene terephthalate with a solution viscosity (SV) of 770

50.0% by weight of regrind with an SV of 730

The production conditions in the individual steps were:

| Extrusion: | Temperatures | |
| --- | --- | --- |
| | Layer A: | 290° C. |
| | Layer B: | 290° C. |
| | Layer C: | 290° C. |
| Longitudinal stretching: | Temperature: | 80–125° C. |
| | Longitudinal stretching ratio: | 4.7 |
| Transverse stretching: | Temperature: | 80–135° C. |
| | Transverse stretching ratio: | 4.0 |
| Heat-setting: | Temperature: | 210–225° C. |

Comparative Examples 1 to 5 (ABA), 6 (A/B/A') and 7 (Mono)

For Comparative Examples 1 to 6, the procedure followed the technical description for Examples 1 to 9. The pigmentation of the outer layers A(C=A) is given in Table 3. The differing thicknesses of the outer layers were set by reducing and/or increasing the throughput of the extruders.

In Comparative Example 7, only layer B was pigmented. Neither coextruder was used.

TABLE 2

| | Coextrusion A | | | Coextrusion C | | | $R_a$ roughness | |
| --- | --- | --- | --- | --- | --- | --- | --- | --- |
| | $CaCO_3$ | | $Al_2O_3$ $d_{50}$ = 0.06 μm | $CaCO_3$ | | $Al_2O_3$ $d_{50}$ = 0.06 μm | Org. pig. $d_{50}$ = 0.04 μm | $R_A/R_Z$ A (outward-facing) | $R_A/R_Z$ C (inward-facing) |
| Ex. No. | $d_{50}$ [μm] | % | % | $d_{50}$ [μm] | % | % | % | [nm] | [nm] |
| 1 | 0.6 0.8 | 0.45 0.04 | ./. | 0.7 | 0.5 | 0.1 | ./. | 13/96 | 12/93 |
| 2 | 0.6 | 0.45 | ./. | 0.7 | 0.5 | 0.1 | ./. | 13/90 | 12/99 |
| 3 | 0.6 | 0.25 | ./. | 0.7 | 0.5 | 0.1 | ./. | 9/70 | 13/105 |
| 4 | 0.6 | 0.65 | ./. | 0.7 | 0.5 | 0.1 | ./. | 14/94 | 12/91 |
| 5 | 0.6 | 0.45 | ./. | 0.4 0.7 | 0.5 0.4 | 0.45 | ./. | 12/81 | 13/90 |
| 6 | 0.6 | 0.45 | ./. | 0.4 0.7 | 0.5 0.1 | 0.45 | ./. | 11/72 | 11/94 |
| 7 | 0.6 | 0.45 | ./. | 0.8 | 0.06 | 0.40 | ./. | 12/93 | 14/99 |
| 8 | 0.7 | 0.3 | ./. | 0.7 | 0.5 | 0.45 | ./. | 11/79 | 13/103 |
| 9 | 0.6 | 0.2 | ./. | 0.7 | 0.4 | 0.3 | ./. | 9/64 | 12/93 |

Examples 1 to 9: ABC (thickness of layer A = C = 1 μm, B = 13 μm)
Percentages are given in % by weight

TABLE 3

| Comp. Ex. No. | Coextrusion A = Coextrusion C | | | Layer thickness μm | | | Roughness | |
|---|---|---|---|---|---|---|---|---|
| | CaCO₃ | Al₂O₃ d₅₀ = 0.06 | | | | | Rₐ/R_z | Rₐ/R_z |
| | d₅₀ [μm] | % | % | A | B | A (CE 6 = A') | A outward-facing A | C inward-facing C |
| 1 | 0.6 | 0.51 | 0.645 | 1.4 | 12.2 | 1.4 | 15/107 | 15/105 |
| 2 | 0.6 | 0.51 | 0.645 | 0.6 | 13.8 | 0.6 | 13/98 | 12/91 |
| 3 | 0.6 | 0.51 | 0.645 | 2.0 | 11.0 | 2.0 | 17/110 | 16/110 |
| 4 | 0.6 0.8 | 0.45 0.04 | 0.45 | 1.0 | 13.0 | 1.0 | 13/84 | 12/79 |
| 5 | 0.7 | 0.3 | 0.45 | 1.0 | 13.0 | 1.0 | 11/80 | 11/73 |
| 6 | 0.6 | 0.51 | 0.645 | 0.6 | 12.4 | 2.0 | 11/70 | 14/86 |
| 7 | 0.7 | 0.265 | 0.3 | ./. | 15 | ./. | 15/101 | 15/99 |

Layer C = layer A → A/B/A (10 = A/B/A')
Percentages are given in % by weight

Table 4 shows clearly that films whose topography is within the range according to the invention (Examples 3 and 9) have excellent electromagnetic properties and satisfactory (Example 3) or, respectively, excellent abrasion properties (Example 9). Variation of the parameters A, B, F and G shows the effect which these have on electromagnetic and abrasion properties. In the examples according to the invention an improvement of up to 2 db was obtained in EMP compared with the standard (Comparative Example 4, CE 4).

Comparative Examples 5 (ABA), 6 (ABA') and 7 (mono) resulted in good abrasion performance of the reverse side but with markedly poorer electromagnetic properties for the magnetic side compared with the prior art. In Comparative Examples 1 to 7 the electromagnetic properties of the magnetic tapes did not meet the requirements placed upon them here.

What is claimed is:

1. A biaxially oriented, coextruded polyester film comprising at least three layers and whose two surfaces are formed by outer layers A and C, where a base layer B is located between these outer layers, wherein layers A and C have different compositions, and wherein the outer layer A has an $R_a$ value of $\leq 15$ nm, and has an $R_z$ value of $\leq 150$ nm and

TABLE 4

| Example | Rₐ(A) (nm) | Rₐ(C) (nm) | haze per unit thickness | A | B | F | G | EMP | Abrasion resistance |
|---|---|---|---|---|---|---|---|---|---|
| 1 | 13 | 12 | 0.24 | 6449 | −9.9 | 2402 | −6.4 | 0 | 0 |
| 2 | 13 | 12 | 0.23 | 4178 | −8.2 | 2394 | −6.4 | 0 | 0 |
| 3 | 9 | 13 | 0.20 | 2359 | −7.3 | 2394 | −6.4 | ++ | 0 |
| 4 | 14 | 12 | 0.26 | 6278 | −8.6 | 2394 | −6.4 | − | 0 |
| 5 | 12 | 13 | 0.25 | 4543 | −8.1 | 10125 | −9.0 | 0 | ++ |
| 6 | 11 | 11 | 0.21 | 4543 | −8.1 | 14472 | 11.7 | 0 | + |
| 7 | 12 | 14 | 0.26 | 4619 | −8.5 | 15830 | −12.6 | 0 | + |
| 8 | 11 | 13 | 0.22 | 1751 | −6.5 | nd | nd | − | ++ |
| 9 | 9 | 13 | 0.21 | 1991 | −7.5 | 2300 | −6.1 | ++ | ++ |

− poor  0 standard  + good  ++ very good  nd not determined

Table 5 shows that prior art films (ABA films, ABA' films and monofilms) do not achieve the object of the invention.

Parameters F and G were not determined for Comparative Examples 1 to 5 and 7, since these concern symmetrical films.

TABLE 5

| Comp. Ex. | Rₐ outward-facing (nm) | Rₐ inward-facing (nm) | haze per unit thickness | A | B | F | G | EMP | Abrasion resistance |
|---|---|---|---|---|---|---|---|---|---|
| 1 | 15 | 15 | 0.33 | 6120 | −8.8 | − | − | 0 | nd |
| 2 | 13 | 12 | 0.27 | 4898 | −8.6 | − | − | 0 | nd |
| 3 | 17 | 16 | 0.43 | 5388 | −8.3 | − | − | 0 | 0 |
| 4 | 13 | 12 | 0.28 | 6149 | −8.9 | − | − | 0 | + |
| 5 | 11 | 11 | 0.21 | 2394 | −7.0 | − | − | − | + |
| 6 | 11 | 14 | 0.23 | 4956 | −8.7 | 5264 | −8.2 | − | + |
| 7 | 15 | 15 | 0.5 | 1971 | −6.9 | − | − | − | + |

− poor  0 standard  + good  ++ very good has a number of elevations $N_a$ per 0.36 mm² which is related as follows to their respective heights $h_a$:

$$A_1 \cdot e^{-B_1 \cdot h_a} \leq N_a \leq A_2 \cdot e^{-B_2 \cdot h_a} \tag{1}$$

where $A_1=300$, $A_2=7000$ $B_1=7.0$, $B_2=8.0$ and $0.01\ \mu m \leq h_a \leq 1.0\ \mu m$ and the outer layer C has an $R_a$ value which is greater than that of the outer layer A and has a number of elevations $N_c$ per 0.36 mm² which is related as follows to their respective heights $h_c$:

$$N_c \leq F \cdot e^{-G \cdot h_c} \tag{2}$$

where $F=20,000$, $G=9.0$ and where the haze per unit thickness is $\leq 0.4\%/\mu m$.

2. A film as claimed in claim 1, wherein the outer layers A and C comprise particles.

3. A film as claimed in claim 2, wherein the concentration of particles present in the outer layer A is from 500 to 10,000 ppm, based on the weight of the outer layer.

4. A film as claimed in claim 2, wherein the concentration of particles present in the outer layer C is from 1000 to 15,000 ppm, based on the weight of the outer layer.

5. A film as claimed in claim 2, wherein the median particle size $d_{50}$ of the particles is from 0.1 to 2.0 $\mu m$.

6. A film as claimed in claim 2, wherein the particles in at least one outer layer have a bimodal distribution.

7. A film as claimed in claim 6; wherein outer layer A contains particles systems in a bimodal distribution, and one of the particle systems in outer layer A more frequently occurs than the other, and the median particle size $d_{50}$ of the particles of the most frequently occurring particle system in the outer layer A is lower than that of the particles in the outer layer C.

8. A film as claimed in claim 2, wherein the differing topographies, expressed by equations (1) and (2), of the outer layers A and C, which may contain particle systems, are established by varying the concentration of the particles/particle systems in the outer layers A and C and/or by means of different median particle sizes $d_{50}$ of the particle/particle systems in the outer layers A and C.

9. A film as claimed in claim 1, wherein the thicknesses of the outer layers A and C, independently of one another, are identical or different and are from 0.3 to 2.5 $\mu m$.

10. A film as claimed in claim 1, wherein the total film thickness is from 5 to 40 $\mu m$.

11. A film as claimed in claim 1, wherein the base layer B comprises regenerated film material.

12. A process for producing a biaxially oriented, coextruded polyester film which has at least three layers, as claimed in claim 1, which comprises:

(a) feeding polyester melts corresponding to the compositions of the outer and base layers to a coextrusion die;

(b) extruding the melts from the coextrusion die onto a chill roll to create a prefilm;

(c) orienting the prefilm biaxially; and (d) heat-setting the prefilm.

13. A magnetic recording medium comprising a film as claimed in claim 1 and a magnetizable layer applied to one surface of the film.

14. A magnetic recording medium as claimed in claim 13, wherein the magnetizable layer has been applied to the outer layer A.

15. A method for recording video, sound, data, or other information, comprising employing a film as claimed in claim 1 as magnetic tape.

16. A method for producing a thermal transfer ribbon, comprising producing the ribbon from a film as claimed in claim 1.

17. A film as claimed in claim 1, further comprising an intermediate layer between the base layer and at least one of the outer layers.

18. A film as claimed in claim 1, wherein the difference in $R_a$ values between layers A and C is at least 2 nm.

19. A film as claimed in claim 1, wherein the $R_a$ value of the outer layer A is $\leq 13$ nm.

20. A film as claimed in claim 1, wherein the $R_a$ value of the outer layer C is $\leq 25$ nm.

* * * * *